United States Patent Office 2,900,343
Patented Aug. 18, 1959

2,900,343

MAGNETIC FLUID FOR MAGNETIC FLUID CLUTCH

Robert Lee Roy Barns, Wichita, Kans., Ralph Tilman Dosher, Jr., Mary Louise Humphries, and Jack K. Jeanes, Dallas, Tex., Luther Lawrence Lyon, Jr., Wichita, Kans., Edward Gordon Perry, Dallas, Robert James Speer, Richardson, and Charles E. Earhart, Dallas, Tex., assignors to Texas Instruments Incorporated, Dallas, Tex., a corporation of Delaware No Drawing. Application June 3, 1953
Serial No. 359,444

2 Claims. (Cl. 252—62.5)

This invention relates to magnetic fluid clutches and more particularly to magnetic fluids for use therein and to a method for the preparation of such fluids.

Magnetic fluid clutches are of relatively recent origin. See United States Letters Patent No. 2,575,360, granted November 20, 1951, to Jacob Rabinow.

Magnetic fluid clutches in general, comprise a clutch housing, magnetic poles and a fluid reservoir. A torque cup or disc is attached to an output shaft which is supported in bearings in the clutch housing so that the torque cup is free to rotate in the reservoir, which is filled with a magnetic fluid. The housing is internally arranged so that the torque cup is between the magnetic poles, and the portion of the reservoir between the magnetic poles forms a working gap.

The principle of operation of the clutch is such that when a magnetic flux is caused to flow across the working gap either by introducing a permanent magnet in the magnetic circuit of the clutch or by applying current to a flux generating signal coil, this magnetic flux acts on the magnetic fluid in the working gap and this action causes the magnetic particles in the fluid to so orient themselves as to resist rotation of the cup with relation to the clutch housing.

Generally the clutch housing is driven at a constant speed and the torque cup tends to be driven to a greater or lesser extent depending upon the strength of the magnetic flux in the working gap.

One use to which magnetic fluid clutches have been put is the measurement of electrical currents. For this purpose the two clutches are mounted in a housing to form a meter movement and are generally driven at a constant speed but in opposite directions. The turning of the torque cup or disc of one clutch is resisted by the turning of the torque cup in the other clutch resulting in a balanced output. The current to be measured is applied to the meter movement in such a manner that it increases the magnetic flux across the working gap of one clutch and decreases the magnetic flux across the working gap of the other clutch. The greater this current the greater the differential of the flux across the working gaps and the greater the unbalance of the clutches. This unbalance is resisted by a spring or other resilient means which in turn positions an indicating needle or recording pen.

In such an arrangement as has just been described, the magnetic fluid of the clutch is a very essential and critical factor. The difficulties that can and do result from an unsatisfactory magnetic clutch fluid are many and varied.

The viscosity of the oil in magnetic fluids increases as the temperature decreases and therefore the no-flux resistance to relative movement between the clutch body and the torque cup increases, which may produce greater unbalance in the meter movement. Even though the needle or pen may usually be adjusted to zero by repositioning the spring or other motion resisting mechanism, the result is generally to increase the sensitivity of the device and make its readings inaccurate.

On the other hand, high temperatures are apt to vaporize or chemically decompose the magnetic clutch fluid. The vaporization of a part of the fluid tends to increase the iron concentration, thus reducing the reluctance of the circuit and resulting in erroneous measurements. The chemical breakdown of the fluid either by reason of high temperature or by reason of its chemical instability in the presence of various metals used in the construction of the clutch is apt to result in the formation of gum deposits on the surfaces of the clutch, and these in turn also result in measurement errors.

It may be noted in passing that the use of iron powder without any suspending fluid has been suggested but it has not been found satisfactory in measuring devices and other applications requiring smooth operation, because the use of iron powder alone does not give sufficiently smooth operation.

Another difficulty that has been encountered in the use of magnetic fluid clutches as current measuring devices is the result of a phenomenon that may be described as "creep." Thus, when a given current is applied to a magnetic fluid clutch measuring instrument, the needle or pen assumes a certain position, then, although the same current continues to be applied to the clutch, the pen or needle beings to move either up or down scale.

The purpose of this invention is to provide a magnetic fluid clutch fluid that will satisfactorily operate through a wide range of temperatures, permitting the clutch to operate smoothly and consistently so that it can be used as a satisfactory measuring instrument that will have a long life without appreciable breakdown, and that may be stored for long periods of time without the use of a magnetic field, and still without appreciable sedimentation of iron particles.

It is also an object of this invention to provide a method for making such a fluid and to provide a method for adjusting such a fluid so as to avoid creep in the magnetic fluid clutch in which it is eventually to be used.

Specifically, this invention consists in the provision of four closely related but very specific magnetic fluid clutch fluids and a method of adjusting these clutch fluids to a particular clutch to obtain the best operating conditions.

It seems best to start the description of specific examples at this point and follow with a discussion of equivalents in view of the fact that the specific fluids are the result of completed research and the discussion of equivalents will necessarily involve the expression of some conclusions inferred from known facts rather than proved experimentally.

*Fluid I*

The first of two specific clutch fluids that have been tested and found satisfactory has a base that is a U.S.P. white oil derived from a naphthenic base stock and having a general formula $C_nH_{2n-3}$. It has a density of 0.874 gm./ml. at 26° C., a pour point below −30° C., a viscosity of 126 centipoises at 26° C., a refractive index at 20° C. of 1.4802 and an unsulfonatable residue of 100%. Such an oil is sold on the market by Esso Standard Oil Company, New York, N.Y., under the trade name "Nujol."

The clutch fluid is prepared by dispersing in this base oil a quantity of finely divided carbonyl iron of an average particle size of 3 microns. The proportion of iron to oil is approximately 6:1 by weight. The dispersion is accomplished by first drying the carbonyl iron in vacuum at 130° C., plus or minus 5°, and thereafter mixing it with the oil and placing the mixture in a ball mill for about sixteen hours, until the iron is thoroughly and evenly dispersed throughout the oil.

The resulting mixture has been found to be useful in magnetic clutch measuring devices at temperatures as low as zero degrees C. and as high as 55° C. It appears to be stable in the presence of reasonably high temperatures and over long periods of time, and in the presence of any of the metals normally used in magnetic fluid clutches.

*Fluid II*

This fluid as a base mixture of the white oil described above and dodecene-1 which has a specific gravity of 0.7582 at 26° C., a pour point of less than —33.6° C., and a viscosity of 1.2 centistokes at 26° C. The base oil is formed by mixing white oil in the amount of 78.6% by volume and dodecene-1 in the amount of 21.4% by volume.

Carbonyl iron is incorporated as in Fluid I and the resultant magnetic clutch fluid has, like Fluid I, good stability and the ability to withstand action of any of the metals normally used in magnetic fluid clutches.

Our experience indicates that white oil of the approximate characteristics of the one used in the examples may be used either alone or in combination with up to 30% by weight of dodecene-1. It further indicates that carbonyl iron or other finely divided magnetic iron varying in average size between 3 and 10 microns will be satisfactory. Specifically, we known that carbonyl iron of the average particle size of 3, 5, 8 and 10 microns is satisfactory. Our experience also indicates that ratios of from 2:1 to 9:1 by weight of iron to oil are usable, in accordance with this invention.

In using the magnetic fluid clutch fluids of this invention, we have found it highly desirable to adjust each fluid to the particular clutch or type of clutch in which it is to operate. We find that, in general, when a magnetic fluid clutch fluid is placed in a clutch and that clutch is used as a part of the measuring instrument, the measuring instrument will creep unless the fluid is adjusted to the clutch.

"Creep" is a characteristic of a measuring instrument that causes its needle or recording pen to move either toward or away from the zero point after a steady current has been applied to the measuring instrument and during the continuance of that steady current application to the instrument.

The reason for creep in a magnetic clutch instrument is apparently a movement of magnetic particles into or out of the working gap of the magnetic clutch under the influence of a continuously applied flux. This apparently happens in all magnetic fluid clutches in which there is a reservoir or space outside of the working gap in which magnetic fluid can circulate. That is, it happens in all such clutches unless the ratio of iron to fluid is adjusted so as to be just right to prevent it.

In accordance with this invention, the magnetic fluids prepared in accordance with this invention are tested by actual operation in a magnetic fluid clutch measuring instrument under constant current conditions, or constant flux conditions, and are then adjusted by changing the ratio of iron to oil so that the ratio is exactly, or at least very nearly, that which is required to prevent creep.

What is claimed is:

1. A magnetic fluid for magnetic fluid clutches consisting essentially of a carrier liquid including as its major ingredients a U.S.P. white oil derived from a naphthenic base stock and having a general formula of $C_nH_{2n-3}$, a density of around 0.874 gm./ml. at 26° C., a pour point below —30° C., a viscosity of around 126 centipoises at 26° C., a refractive index at 20° C. of around 1.4802 and an unsulfonatable residue of approximately 100%, and dodecene-1, the dodecene-1 being present in a proportion less than 30% by weight, said carrier having dispersed therein a quantity of finely divided dry iron particles of an average size of between about 3 and 10 microns and the ratio of iron to carrier oil being between about 2:1 and 9:1 by weight.

2. A magnetic fluid for magnetic fluid clutches consisting essentially of a U.S.P. while oil derived from a naphthenic base stock and having a general formula $C_nH_{2n-3}$, a density of approximately 0.874 gm./ml. at 26° C., a pour point below —30° C., a viscosity of approximately 126 centipoises at 26° C., a refractive index at 20° C. of approximately 1.4802 and an unsulfonatable residue of approximately 100%, said white oil having added thereto dodecene-1 to the extent of about 21.4% by volume to about 76.8% by volume of white oil, and the mixture carrying a quantity of dry finely divided carbonyl iron of an average particle size of approximately 3 microns, the proportion of iron to oil being approximately 6:1 by weight.

References Cited in the file of this patent

Addendum to Tech. Rept. 1213 on Magnetic Fluid Clutch, May 9, 1949, 4 pp.

G. E. Review, December 1949, pages 39–43.

(Nat'l Bur. of Standards Tech. News Bull.), page 169–174, December 1950, v. 34, No. 12.